(12) United States Patent
Liu et al.

(10) Patent No.: US 12,723,163 B2
(45) Date of Patent: Sep. 1, 2026

(54) COATING FOR PREVENTING MARINE BIOFOULING AND PREPARATION METHOD THEREOF

(71) Applicants: North China Electric Power University, Beijing (CN); Ocean Shield Inc., Montreal (CA)

(72) Inventors: Zongde Liu, Beijing (CN); Herong Ma, Beijing (CN); Zhongxun Liu, Beijing (CN)

(73) Assignees: North China Electric Power University, Beijing (CN); Ocean Shield Inc., Montreal (CA)

( * ) Notice: Subject to any disclaimer, the term of this patent is extended or adjusted under 35 U.S.C. 154(b) by 742 days.

(21) Appl. No.: 18/108,344

(22) Filed: Feb. 10, 2023

(65) Prior Publication Data

US 2024/0174868 A1 May 30, 2024

(30) Foreign Application Priority Data

Nov. 24, 2022 (CN) ......................... 202211486519.6

(51) Int. Cl.
*B32B 15/18* (2006.01)
*B22F 9/08* (2006.01)
(Continued)

(52) U.S. Cl.
CPC ............ *C09D 5/1618* (2013.01); *B22F 9/082* (2013.01); *C09D 7/61* (2018.01); *C09D 7/66* (2018.01);
(Continued)

(58) Field of Classification Search
None
See application file for complete search history.

(56) References Cited

FOREIGN PATENT DOCUMENTS

CN 108165918 A * 6/2018 ............. C23C 4/134
CN 115287649 A * 11/2022 ........... C23C 24/106
JP H05140678 A * 6/1993

OTHER PUBLICATIONS

Yoshida et al., machine translation of JP H05-140678, Jun. 8, 1993 (Year: 1993).*

(Continued)

*Primary Examiner* — Mary I Omori
(74) *Attorney, Agent, or Firm* — Notaro, Michalos & Zaccaria P.C.

(57) ABSTRACT

Provided are a coating for preventing marine biofouling and a preparation method thereof, wherein, the coating for preventing marine biofouling, including an antifouling cladding layer disposed on a metal substrate, the antifouling cladding layer is a metastable-phase antifouling cladding layer; the antifouling cladding layer includes a dispersedly distributed Fe-rich precipitation phase and a Cu-rich solid solution containing supersaturated Fe, and the Cu-rich solid solution containing supersaturated Fe is a Cu—Fe—Sn—Si—P copper-based solid solution; the antifouling cladding layer is prepared by a raw material of a Cu—Fe—Sn—Si—P alloy powder; the Cu—Fe—Sn—Si—P alloy powder is prepared by the following raw materials in mass percentage: Fe: 8% to 40%; Sn: 0.3% to 8%; Si: 0.1% to 0.5%; P: 0.1% to 0.5%; and Cu as a balance; and the metal substrate is selected from the group consisting of a steel substrate, a copper alloy substrate, a titanium alloy substrate, and an aluminum alloy substrate.

15 Claims, 7 Drawing Sheets

(51) Int. Cl.
*C09D 5/16* (2006.01)
*C09D 7/40* (2018.01)
*C09D 7/61* (2018.01)

(52) U.S. Cl.
CPC ... *B22F 2009/0848* (2013.01); *B22F 2201/02* (2013.01); *B22F 2301/10* (2013.01); *B22F 2301/15* (2013.01); *B22F 2303/30* (2013.01)

(56) References Cited

OTHER PUBLICATIONS

Tao et al., machine translation CN 108165918, Jun. 15, 2018 (Year: 2018).*

Phosphor Bronze, Mar. 21, 2021, Copper Development Association Inc., https://www.copper.org/resources/properties/microstructure/phos_bronze.html (Year: 2021).*

Zhou et al., machine translation of CN 115287649, Nov. 4, 2022 (Year: 2022).*

Particle Size / Mesh Conversion Chart, 2023, PTI, https://www.powdertechnologyinc.com/particle-size-mesh-conversion-chart/ ( Year: 2023).*

* cited by examiner

COATING FOR PREVENTING MARINE BIOFOULING AND PREPARATION METHOD THEREOF

CROSS REFERENCE TO RELATED APPLICATION

This application claims the benefit and priority of Chinese Patent Application No. 202211486519.6 filed with the China National Intellectual Property Administration on Nov. 24, 2022, the disclosure of which is incorporated by reference herein in its entirety as part of the present application.

TECHNICAL FIELD

The present disclosure belongs to the technical field of new materials and surface engineering, and in particular relates to a coating for preventing marine biofouling and a preparation method thereof.

BACKGROUND

Ships and offshore infrastructures are used in the complex and changeable marine environment and may be damaged by marine biofouling. Therefore, surface antifouling measures are extremely necessary. Nowadays, about 90% of global trade is carried by sea, generating nearly 3% of the global carbon dioxide emissions. Marine biofouling on the hull of a large cargo ship could reduce fuel economy by approximately 50%.

In the 1950s, antifouling coatings were invented with organotin serving as an antifouling agent, and gradually occupied the global market due to their desirable antifouling properties. Since the 1980s, the antifouling coatings used in ships all over the world are mainly tributyltin (TBT)-based self-polishing antifouling coatings containing organotin. However, studies have shown that TBT has the characteristics of accumulation and difficult degradation in organisms, which causes a significant impact on the reproduction and genetics of marine organisms. Since 2008, the TBT-based self-polishing antifouling coatings were gradually banned globally, and researchers had gradually shifted their focus to tin-free self-polishing antifouling coatings (TF-SPCs) containing toxic materials such as cuprous oxide. The first-generation tin-free antifouling coatings was researched and developed in the 1980s. This type of coating is mainly composed of a hydrolyzable base material, low-toxic cuprous oxide, and auxiliary toxic agents. However, studies have shown that the auxiliary toxic agents are almost as harmful to the ocean as organotins. The second-generation antifouling coatings are TF-SPCs, the self-polishing of which is generated based on forming a hydrolyzable active surface layer through ion exchange, followed by adding inorganic fibers to the resin. This ensures the control of polishing rate and enhances the bonding strength of paint film.

After nearly 30 years of development, hydration-type, hydrolysis-type, and hybrid TF-SPCs have been applied to the market at home and abroad, and antifouling coatings made of these TF-SPCs have a period of validity of 3 years, 5 years, and 3 to 5 years, respectively. However, there are still some limitations. For example, the acrylate zinc-based self-polishing antifouling coating tends to stagnate in film thickness loss after 30 months, and basically loses its antifouling function.

Through experimental researches, researchers at the Blacksmith Institute in the United States have found that microplastics such as aged polystyrene (PS) and polyvinyl chloride (PVC) in organic coatings could exist in the ocean for a long time as carriers of heavy metal ions including Cu and Zn, seriously threating the marine organisms and environment.

Overall, the existing self-polishing antifouling coatings have limitations as follows:

(1) since there is no water flow to polish the antifouling layer at rest, the antifouling coating shows a poor antifouling effect when the ship stops sailing for a long time;

(2) volatile organic compounds (VOCs) and other harmful substances (such as zinc oxide and diuron) contained in the antifouling coatings have caused serious pollution to the environment; and (3) microplastics released into the ocean from antifouling coatings are difficult to degrade naturally, posing a serious threat to the marine organisms and environment.

Copper alloys could release a certain concentration of copper ions during seawater immersion, showing excellent antifouling properties. Taking advantage of the toxicity of copper to fouling organisms, the copper ions could be released through copper corrosion to inhibit the attachment of fouling organisms. At present, copper alloys have been widely used in seawater piping systems, propellers and other parts of ships. However, under marine salt-spray corrosion and marine corrosive environments, a layer of relatively-dense corrosion products, for example, basic copper chloride, basic copper carbonate and other corrosion products, may form and adhere to the surface of traditional copper alloys. The continuous deposition of these corrosion products leads to a significant decrease in the precipitation rate of copper ions, seriously affecting the antifouling effect. A large number of examples show that when the ship is parked for a long time, the commonly-used copper alloy propeller basically loses its antifouling ability. FIG. 1 shows a photograph of a copper alloy propeller subjected to severe marine fouling. Domestic scholars conducted a 12-month and field-site coupon corrosion test on 8 traditional copper alloys in Zhanjiang Port. It was found that most of the traditional copper alloy surfaces were completely adhered by marine organisms such as bryozoans and barnacles, basically lost the antifouling ability, and had an antifouling effect of less than 12 months.

SUMMARY

In view of this, the present disclosure aims to provide a coating for preventing marine biofouling and a preparation method thereof. The coating for preventing marine biofouling could prevent marine organisms from adhering for a long time.

To achieve the above objective, the present disclosure provides the following technical solutions.

The present disclosure provides a coating for preventing marine biofouling, including an antifouling cladding layer disposed on a metal substrate, wherein the antifouling cladding layer is a metastable-phase antifouling cladding layer;

the antifouling cladding layer includes a dispersedly distributed Fe-rich precipitation phase and a Cu-rich solid solution containing supersaturated Fe, and the Cu-rich solid solution containing supersaturated Fe is a Cu—Fe—Sn—Si—P copper-based solid solution;

the antifouling cladding layer is prepared by a raw material of a Cu—Fe—Sn—Si—P alloy powder;

the Cu—Fe—Sn—Si—P alloy powder is prepared by the following raw materials in mass percentage:

Fe: 8% to 40%; Sn: 0.3% to 8%; Si: 0.1% to 0.5%; P: 0.1% to 0.5%; and Cu as a balance; and the metal substrate is selected from the group consisting of a steel substrate, a copper alloy substrate, a titanium alloy substrate, and an aluminum alloy substrate.

In some embodiment, when the metal substrate is any one of the steel substrate and the aluminum alloy substrate, a corrosion-resistant primer cladding layer is further provided between the metal substrate and the antifouling cladding layer;

the corrosion-resistant primer cladding layer is prepared by a raw material of a Ni—Cr—Mo—Nb—Si alloy powder; and the Ni—Cr—Mo—Nb—Si alloy powder is prepared by the following raw materials in mass percentage:

Cr: 20% to 24%; Mo: 14% to 18%; Nb: 1% to 1.5%; Si: 0.5% to 1%; and Ni as a balance.

In some embodiments, the antifouling cladding layer has a thickness of 300 μm to 1,000 μm; and the corrosion-resistant primer cladding layer has a thickness of 100 μm to 400 μm.

In some embodiments, the Ni—Cr—Mo—Nb—Si alloy powder and the Cu—Fe—Sn—Si—P alloy powder each have a particle size of 200 mesh to 400 mesh.

In some embodiments, the Cu—Fe—Sn—Si—P alloy powder is prepared by a method including the following steps:

mixing Cu, Fe, Sn, Si, and P according to the mass percentage, and conducting a first hot melting to obtain an antifouling alloy melt; and conducting a first atomization pulverization on the antifouling alloy melt to obtain the Cu—Fe—Sn—Si—P alloy powder, wherein the first hot melting is conducted at a temperature of 1,180° C. to 1,450° C. for 30 min to 60 min; and the first atomization pulverization is conducted with nitrogen as an atomization medium under a flow rate of the antifouling alloy melt at 0.5 kg/min to 1 kg/min.

In some embodiments, the Ni—Cr—Mo—Nb—Si alloy powder is prepared by a method including the following steps:

mixing Ni, Cr, Mo, Nb, and Si according to the mass percentage, and conducting a second hot melting to obtain a primer alloy melt; and conducting a second atomization pulverization on the primer alloy melt to obtain the Ni—Cr—Mo—Nb—Si alloy powder, wherein the second hot melting is conducted at 1,400° C. to 1,600° C. for 30 min to 60 min; and the second atomization pulverization is conducted with nitrogen as an atomization medium under a flow rate of the primer alloy melt at 0.5 kg/min to 1 kg/min.

The present disclosure further provides a method for preparing the coating for preventing marine biofouling, including the following steps:

conducting a pretreatment on the metal substrate to obtain a pretreated substrate; wherein the metal substrate is selected from the group consisting of the steel substrate, the copper alloy substrate, the titanium alloy substrate, and the aluminum alloy substrate; and preparing the antifouling cladding layer by first laser cladding on the pretreated substrate to obtain the coating for preventing marine biofouling.

In some embodiments, the first laser cladding is conducted at a powder feeding rate of 0.8 kg/h to 2 kg/h, a laser power of 2 kW to 6 kW, a relative movement speed of a laser spot and a workpiece of 10 cm/s to 25 cm/s, a flow rate of a protective gas of 15 L/min to 20 L/min, and a step distance of a laser head of 0.5 mm to 0.8 mm.

In some embodiments, the method further includes preparing the corrosion-resistant primer cladding layer when the metal substrate is any one of the steel substrate and the aluminum alloy substrate, and the corrosion-resistant primer cladding layer is prepared by second laser cladding conducted at a powder feeding rate of 0.8 kg/h to 2 kg/h, a laser power of 2 kW to 6 kW, a relative movement speed of a laser spot and a workpiece of 10 cm/s to 25 cm/s, a flow rate of a protective gas of 15 L/min to 20 L/min, and a step distance of a laser head of 0.5 mm to 0.8 mm.

In some embodiments, the pretreatment includes removing oxide layer, washing, and drying in sequence; the removing oxide layer is conducted by any one of sandblasting and electric grinding wheel-based grinding; and a reagent for the washing includes acetone.

The present disclosure provides a coating for preventing marine biofouling, including an antifouling cladding layer disposed on a metal substrate; wherein the antifouling cladding layer is a metastable-phase antifouling cladding layer; the antifouling cladding layer includes a dispersedly distributed Fe-rich precipitation phase and a Cu-rich solid solution containing supersaturated Fe; and the Cu-rich solid solution containing supersaturated Fe is a Cu—Fe—Sn—Si—P copper-based solid solution; the antifouling cladding layer is prepared by a raw material of a Cu—Fe—Sn—Si—P alloy powder; the Cu—Fe—Sn—Si—P alloy powder is prepared by the following raw materials in mass percentage: Fe: 8% to 40%; Sn: 0.3% to 8%; Si: 0.1% to 0.5%; P: 0.1% to 0.5%; and Cu as a balance; and the metal substrate is selected from the group consisting of a steel substrate, a copper alloy substrate, a titanium alloy substrate, and an aluminum alloy substrate.

The present disclosure has the following beneficial effects:

According to the phase diagram and experimental results, Cu and Fe each have a highly little solid solubility with each other in an equilibrium state. Fe has a solid solubility of only 3.5% in Cu at a temperature of 1,050° C.; at a temperature of 635° C., Fe has the solid solubility reduced to 0.15% in Cu. Cu has a solid solubility of only 8.5% in Fe at a temperature of 1,477° C.; at a temperature of 650° C., Cu has the solid solubility of only 0.35% in Fe. In order to solve this problem, in the present disclosure, a metastable-phase antifouling cladding layer is prepared by a rapid solidification method, such that the antifouling cladding layer includes a Cu-rich solid solution containing supersaturated Fe and an iron-rich precipitation phase; the Cu-rich solid solution containing supersaturated Fe is a Cu—Fe—Sn—Si—P copper-based solid solution. By an electrochemical corrosion effect of natural seawater on the antifouling cladding layer, a de-ironized layer with a copper-based solid solution as a skeleton and microchannels with a diameter of about 200 nm to 3,000 nm is formed along a thickness direction of the antifouling cladding layer. The de-ironized layer with the microchannels significantly increases a contact area between the antifouling cladding layer and seawater, and the microchannels are capable of storing copper ions. Through a joint action of alloying and microchannels, a bonding strength between corrosion products and the antifouling cladding layer is effectively reduced, such that the corrosion products on a surface of the cladding layer are loose and contain a large number of holes and cracks. Under a certain flow rate, these loose corrosion products containing a large number of holes and cracks may be peeled off by themselves, so as to achieve a self-polishing effect and realizing long-term prevention of marine organisms from adhering.

A concept of the present disclosure is to form a de-ironized layer in marine environment using the metastable-phase antifouling cladding layer. The Fe atoms participating in the reaction include two parts: (1) a part of Fe atoms and Cu atoms form a partially-ordered segregated Cu—Fe—Sn—Si—P solid solution. According to a standard electrode potential table for common electrode reactions, the standard electrode potentials of ($Fe^{2+}$/Fe) and ($Cu^{2+}$/Cu) are $E^0_{Cu}$=0.34 V (vs SHE) and $E^0_{Fe}$=−0.45 V (vs SHE), respectively. Therefore, in the marine environment, due to a higher chemical activity, Fe atoms may preferentially react to form iron oxides. The reaction starts from the surface, Fe atoms in contact with seawater react preferentially and form vacancies at the corresponding positions. Because the Cu atoms around the vacancies are not bound by the Fe atoms, diffusion, agglomeration, and growth of atoms occur under this influence. Since the microchannels formed by corrosion are quite narrow and long, it may be assumed that a solution in the microchannels is still, forming a closed system with no material exchange but energy exchange with an external solution. Since there is no material exchange between the microchannel and the external environment, the microchannel has an oxygen-deficient corrosion environment inside. A front end of the microchannel is a microenvironment with low pH. Under the action of a voltage potential in the microchannel, iron cations diffuse outward to a microchannel opening, forming iron oxides at the microchannel opening. Some Fe atoms undergo hydrolysis in an etch pit, and according to existing literature, a main product is γ-FeOOH. Affected by $Cl^-$ and the pH value of a micro-zone at the microchannel opening, the γ-FeOOH is further converted into Fe(OH)Cl in the microchannel. As a result, most of formed loose corrosion products are deposited on the surface of the cladding layer, while a small amount of the corrosion products are deposited inside the microchannels. Affected by a potential drop and pH value changes inside the etch pit, the microchannels gradually spread and grow into the antifouling cladding layer. Due to the randomness of a segregation area of Fe atoms, a large number of curved microchannels (diameters ranging from 200 nm to 3,000 nm) similar to earthworm holes are gradually formed, which communicate with the surface of the antifouling cladding layer. (2) Another part of the Fe atoms participating in the reaction comes from the Fe-rich precipitation phase; if the Fe-rich precipitation phase is exposed on the surface of the cladding layer, Fe directly reacts with seawater to form iron corrosion products, and the iron corrosion products dissolve into seawater to form corrosion channels. For the Fe-rich precipitation phase inside the cladding layer, when the microchannels communicate with the Fe-rich precipitation phase, the Fe-rich precipitation phase contacts with seawater, undergoes dealloying to form corrosion holes that communicate with the microchannels (the holes have a shape basically similar to that of the Fe-rich precipitation phase). These micro-holes also become part of the microchannels (a cross-sectional diameter of this area is larger than that of other areas without Fe-rich precipitation phase). A formation process of its corrosion products is similar to that in (1). Through the joint action of the above two parts of Fe atoms, a de-ironized layer with a copper-based solid solution as a skeleton and microchannels with a depth increasing with time is formed along a thickness direction of the cladding layer. Due to the segregation of iron elements on a microscopic scale, the bifurcation may also appear during increasing the length of microchannels.

Experiments have shown that when the antifouling cladding layer is placed in static artificial seawater, a thickness h of the de-ironized layer has an exponential relationship with the time t, which approximately satisfies $h(t)=At^m$. In the above formula, A and m are constants, 0<m<1.

Assuming that the antifouling cladding layer has a thickness of H, the time required for de-ironization of the antifouling cladding layer is $$T_1 = \left(\frac{H}{A}\right)^{1/m}.$$

According to the experimental results, the time required for de-ironization of the antifouling cladding layer may be obtained. For example, when an iron content is in the range of 10% to 40% and H=500 μm, the de-ironization time in static seawater is found to be 100 days to 140 days by experiment.

According to the above analysis, the service process of the antifouling cladding layer could be divided into two stages:

The first stage is a de-ironization stage of the antifouling cladding layer, and the second stage is a copper ion seepage stage with a stable de-ironized layer thickness after the de-ironization. For the second stage, assuming that the seepage rate of copper ions remains constant, an annual consumption rate of the antifouling cladding layer may be estimated. Assuming that the antifouling cladding layer has a copper content of C when it is not immersed in seawater, and a steady-state release rate of copper ions is M (expressed in a unit of $\mu g \cdot cm^{-2} \cdot d^{-1}$), according to the experiment and theoretical analysis, a thickness reduction rate of the antifouling cladding layer is approximately obtained by $$h = 0.425\frac{M}{C}(\mu m/\text{year}).$$

The thickness of the antifouling cladding layer may be designed according to the required antifouling period. For example, if the thickness of the antifouling layer is H=500 μm, then when M=40 $\mu g \cdot cm^{-2} \cdot d^{-1}$, C=70%, it is calculated that h=24.3 μm; and it may be calculated approximately that the antifouling period is $T_2$=20.6 years.

According to the above analysis, the time for the second stage of stable seepage of copper ions is much longer than the time required for the formation of the de-ironized layer.

The microchannel layer has the following functions:

(1) In the first stage of the formation of the de-ironized layer, iron in the antifouling cladding layer is corroded prior to copper, which reduces the release rate of copper ions on the surface of the antifouling cladding layer per unit area. However, when a large number of microchannels in contact with seawater are formed, the contact area between the antifouling cladding layer and seawater is significantly increased. Assuming that there are n microchannels with a circular cross section on the surface of the antifouling cladding layer per unit area, an average diameter of the cross section of the microchannels is d, and the length is L, then the actual contact area between the cladding layer per unit surface area and seawater is (1+πndL); since the length of the microchannel increases with time, the unit area of the antifouling cladding layer in contact with seawater also increases with time. When the thickness of the de-ironized layer reaches the thickness of the antifouling cladding layer, the first stage of de-ironization is completed, entering the second stable release stage.

(2) The microchannel is an elongated blind hole with a length much larger than the diameter. Therefore, it may be approximately assumed that even under dynamic conditions, the seawater in the microchannel is in a static state, and the concentration of copper ions in the microchannel is higher than that outside the microchannel. Therefore, there is only the diffusion of copper ions from the inside of the microchannel to the outside of the outlet, which could keep the concentration of copper ions in the seawater in the microchannel at a high level, that is, the microchannel is capable of storing copper ions, so as to store part of the copper ions in the antifouling cladding layer. When marine organisms are attached to the surface of the antifouling cladding layer, the high concentration of copper ions released by the microchannels could effectively inhibit the growth of marine organisms (FIG. 2).

After the microchannel is formed, copper on an inner wall of the microchannel in contact with seawater could also undergo electrochemical corrosion. Since the seawater in the microchannel is in a static state, the concentration of dissolved oxygen, $OH^-$, and $HCO_3^-$ in the seawater in the microchannel decreases continuously with the increase of the reaction time, which is beneficial to suppress the formation of basic copper carbonate and basic copper chloride on the inner surface of the microchannel. Assuming that the microchannel continuously releases copper ions from the outlet to the seawater at a certain rate (not at a constant rate). Through theoretical analysis, it can be found that the pore size of the microchannel increases with time, and the pore size near the outlet of the microchannel increases at the fastest rate with time. According to the analysis of the existing electrochemical corrosion theory, it can be found that the concentration of copper ions near the outlet of the microchannel in seawater is significantly higher than that in the area without microchannels under the same ordinate. The copper ion concentration distribution in the area near the microchannel is shown in FIG. 3, where the area with the densest dots indicates the area with the highest concentration of copper irons.

(3) By the alloying effect of Sn, Si and P elements, the bonding strength between the corrosion products and the antifouling cladding layer may be reduced, such that the corrosion products on the surface of the cladding layer are loose and contain cracks; through a truncation effect at the outlet of the microchannel, the corrosion products on the surface of the antifouling cladding layer produce a large number of holes of 200 μm to 3,000 μm; under a certain flow rate, these loose surface corrosion products containing holes and cracks may peel off by themselves, thereby achieving a self-polishing effect.

In the present disclosure, the coating for preventing marine biofouling may be used for a variety of structural parts working in harsh marine environments, including outer plates, propellers, and sonar domes that are below the waterline of ships, seawater piping systems, steel structural parts of offshore drilling platforms in contact with seawater, and steel structural parts of offshore wind turbines in contact with seawater.

The present disclosure further provides a method for preparing the coating for preventing marine biofouling as described above, including the following steps: conducting a pretreatment on the metal substrate to obtain a pretreated substrate; wherein the metal substrate is selected from the group consisting of the steel substrate, the copper alloy substrate, the titanium alloy substrate, and the aluminum alloy substrate; and preparing the antifouling cladding layer by first laser cladding on the pretreated substrate to obtain the coating for preventing marine biofouling. In the present disclosure, the antifouling cladding layer is prepared by laser cladding, such that the antifouling cladding layer and the metal substrate are metallurgically bonded, with a bonding strength 30 times higher that of the antifouling coating. The antifouling cladding layer may work for a long time under harsh environments such as high stress, temperature change, and alternating wet and dry corrosion. The antifouling cladding layer avoids the disadvantages caused by low bonding strength of paint and thermal spray coating, and has a long-term effect and environmental friendliness.

BRIEF DESCRIPTION OF THE DRAWINGS

in FIG. 2, 1 refers to a substrate; 2 refers to a Cu-rich substrate phase of the antifouling cladding layer; 3 refers to a Fe-rich precipitation phase of the antifouling cladding layer; 4 refers to holes formed after the Fe-rich precipitation is corroded during seawater immersion; 5 refers to the microchannels formed in the antifouling cladding layer during seawater immersion; 6 refers to marine fouling organisms (barnacles) attached to a surface of the antifouling cladding layer with microchannels; and 7 refers to a corrosion product generated on the surface of the antifouling cladding layer;

in FIG. 3, where the area with the densest dots indicates the area with the highest concentration of copper irons; 8 refers to the surface of the antifouling cladding layer; and 9 refers to the microchannel;

in FIG. 4, 10 refers to an upper surface of the rudder blade; 11, 12, and 13 each refer to weld areas; 14 refers to a side steel plate of the rudder blade; and 15 refers to a base plate at a lower end of the rudder blade;

in FIG. 8, 16 refers to a Fe-rich precipitation phase; and 17 refers to a Cu-rich substrate phase;

in FIG. 9, 18 refers to a distribution result of the Cu element; and 19 refers to a distribution result of the Fe element;

in FIG. 11, 20 refers to an element content curve of Cu; and 21 refers to an element content curve of Fe;

in FIG. 12, 22 to 27 each refer to microcell scanning areas of different positions.

in FIG. 14, 28 refers to an alloy melt, 29 refers to a crucible (i.e., a tundish), 30 refers to a nozzle, and 31 refers to an atomization chamber.

DETAILED DESCRIPTION OF THE EMBODIMENTS

Figure 1:
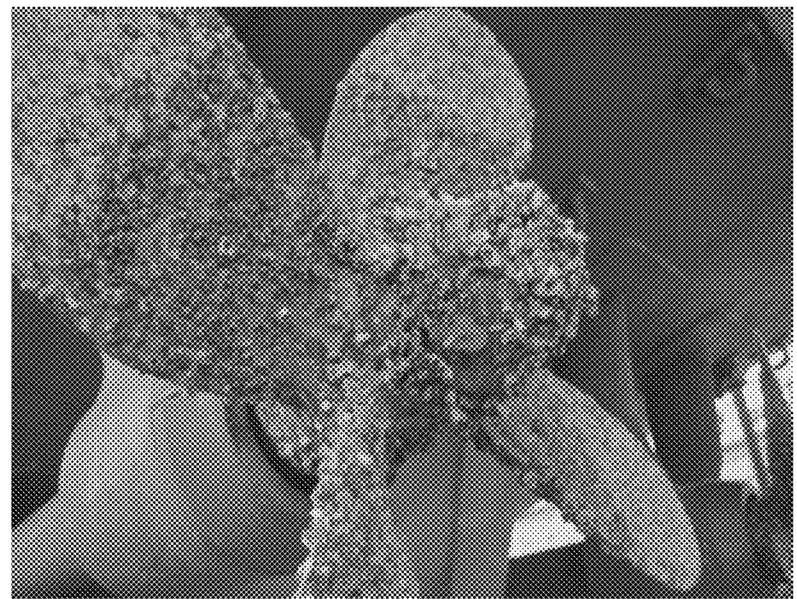
FIG. 1 shows a photograph of a copper alloy propeller subjected to severe marine biofouling.

The present disclosure provides a coating for preventing marine biofouling, including an antifouling cladding layer disposed on a metal substrate, wherein

- the antifouling cladding layer is a metastable-phase antifouling cladding layer;
- the antifouling cladding layer includes a dispersedly distributed Fe-rich precipitation phase and a Cu-rich solid solution containing supersaturated Fe, and the Cu-rich solid solution containing supersaturated Fe is a Cu—Fe—Sn—Si—P copper-based solid solution;
- the antifouling cladding layer is prepared by a raw material of a Cu—Fe—Sn—Si—P alloy powder;
- the Cu—Fe—Sn—Si—P alloy powder is prepared by the following raw materials in mass percentage:
- Fe: 8% to 40%; Sn: 0.3% to 8%; Si: 0.1% to 0.5%; P: 0.1% to 0.5%; and Cu as a balance; and
- the metal substrate is selected from the group consisting of a steel substrate, a copper alloy substrate, a titanium alloy substrate, and an aluminum alloy substrate.

In some embodiments of the present disclosure, the raw materials provided herein are all commercially-available products unless otherwise specified.

The present disclosure provides a coating for preventing marine biofouling, including an antifouling cladding layer disposed on a metal substrate. The metal substrate is selected from the group consisting of a steel substrate, a copper alloy substrate, a titanium alloy substrate, and an aluminum alloy substrate. The antifouling cladding layer is a metastable-phase antifouling cladding layer. The antifouling cladding layer includes a dispersedly distributed Fe-rich precipitation phase and a Cu-rich solid solution containing supersaturated Fe; and the Cu-rich solid solution containing supersaturated Fe is a Cu—Fe—Sn—Si—P copper-based solid solution. In some embodiments, the Fe-rich precipitation phase has a particle size of 200 nm to 1,000 nm.

In the present disclosure, the antifouling cladding layer has a thickness of preferably 300 μm to 1,000 μm, more preferably 400 μm to 900 μm, and even more preferably 500 μm to 800 μm. The antifouling cladding layer is prepared by a raw material of a Cu—Fe—Sn—Si—P alloy powder; in some embodiments the Cu—Fe—Sn—Si—P alloy powder has a particle size of 200 mesh to 400 mesh.

In the present disclosure, the Cu—Fe—Sn—Si—P alloy powder is prepared by the following raw materials in mass percentage: Fe: 8% to 40%; Sn: 0.3% to 8%; Si: 0.1% to 0.5%; P: 0.1% to 0.5%; and Cu as a balance.

In the present disclosure, the Cu—Fe—Sn—Si—P alloy powder includes Fe with a mass percentage of 8% to 40%, preferably 10% to 40%, more preferably 15% to 35%. Fe has the following functions: (1) Fe has a low electrode potential and high chemical activity, and could be dissolved preferentially, which is helpful for the formation of de-ironized microchannel layer and micro-holes in the antifouling cladding layer; and (2) the microchannels formed after iron removal could cause a large number of hole defects in the corrosion products on the surface of the antifouling cladding layer, which is helpful for the peeling off of the corrosion products to realize the self-polishing effect. If the Fe content in the antifouling cladding layer is extremely low, the volume fraction of microchannels formed in the antifouling cladding layer is also extremely low, and it cannot be achieved that the antifouling performance is significantly better than that of flat copper alloys. High iron content is conducive to the formation of a larger volume fraction of microchannels in the antifouling cladding layer; however, in the antifouling cladding layer, an excessive Fe content may lead to an increase in the annual thinning rate of the antifouling cladding layer thickness and a decrease in the antifouling period. Therefore, on the basis of experiments, an optimal range of Fe content is proposed at 8% to 40% by mass percentage.

In the present disclosure, the Cu—Fe—Sn—Si—P alloy powder includes Sn with a mass percentage of 0.3% to 8%, preferably 3% to 7%, more preferably 4% to 6%. Sn may promote the formation of layered corrosion products of different components on the surface of the copper alloy cladding layer, and through the internal stress generated between the corrosion products of different components, there may be a large number of microcracks in the corrosion products, such that the release rate of copper ions does not decrease sharply due to the thickening of corrosion products.

In the present disclosure, the Cu—Fe—Sn—Si—P alloy powder includes Si with a mass percentage of 0.1% to 0.5%, preferably 0.2% to 0.4%, more preferably 0.35%.

In the present disclosure, the Cu—Fe—Sn—Si—P alloy powder includes P with a mass percentage of 0.1% to 0.5%, preferably 0.15% to 0.3%, more preferably 0.25%.

In the present disclosure, the Cu—Fe—Sn—Si—P alloy powder includes Cu as a balance. Cu is a basic element to improve the antifouling performance of the antifouling cladding layer in seawater, providing copper ions to kill marine organisms. In addition, when the antifouling cladding layer is prepared by laser cladding, Cu may precipitate the supersaturated Fe in the melt during the solidification, thereby forming a dispersedly-distributed Fe-rich phase and Cu-rich substrate phase. At room temperature, Cu has a different crystal structure from that of Fe and cannot form an infinite solid solution. Fe has little solid solubility in Cu. In preparing the antifouling cladding layer, the powder material is heated by a laser beam to a temperature above the melting point, and when the laser beam is removed, the molten pool cools down rapidly and solidifies rapidly. Due to the low solubility of Fe in Cu, a part of Fe precipitates out during the solidification, forming dispersedly distributed unstable Fe-rich phase (Fe-rich phase is a Fe—Cu—Sn—Si—P solid solution with high Fe content and low Cu content) and an unsteady Cu-rich phase (a Cu—Fe—Sn—Si—P solid solution containing supersaturated Fe).

In the present disclosure, Fe is added to the alloy powder, and a part of Fe atoms and Cu atoms form a non-equilibrium and partially-ordered segregated Cu—Fe—Sn—Si—P solid solution; another part of Fe atoms forms an unstable Fe-rich precipitation phase. Si and P could reduce the metal oxide content in the cladding layer, improve the fluidity of the alloy melt in the molten pool during cladding, and promote the formation of loose corrosion products containing crack defects on the surface of the antifouling cladding layer.

In the present disclosure, a method for preparing the Cu—Fe—Sn—Si—P alloy powder includes the following steps:

mixing Cu, Fe, Sn, Si, and P according to the mass percentage, and conducting a first hot melting to obtain an antifouling alloy melt; and conducting a first atomization pulverization on the antifouling alloy melt to obtain the Cu—Fe—Sn—Si—P alloy powder.

In the present disclosure, Cu, Fe, Sn, Si, and P are mixed according to the mass percentage, and a first hot melting is conducted to obtain an antifouling alloy melt. In some embodiments, a process for mixing Cu, Fe, Sn, Si, and P according to the mass percentage, and conducting the first hot melting includes: heating and melting Cu, and adding Fe, Sn, Si, and P after the Cu is completely melted to conduct the first hot melting. The first hot melting is conducted at preferably 1,180° C. to 1,450° C., more preferably 1,200° C. to 1,400° C., and even more preferably 1,250° C. to 1,350° C. for preferably 30 min to 60 min, more preferably 40 min to 50 min.

In the present disclosure, a first atomization pulverization is conducted on the antifouling alloy melt to obtain the Cu—Fe—Sn—Si—P alloy powder. In some embodiment, the first atomization pulverization is conducted with nitrogen as an atomization medium under a flow rate of the antifouling alloy melt at preferably 0.5 kg/min to 1 kg/min, more preferably 0.6 kg/min to 0.9 kg/min, and even more preferably 0.7 kg/min to 0.8 kg/min.

In some embodiments, after the first atomization pulverization, sieving is further conducted; there is no special limitation on parameters of the sieving, as long as the Cu—Fe—Sn—Si—P alloy powder with the target particle size could be obtained.

Figure 2:
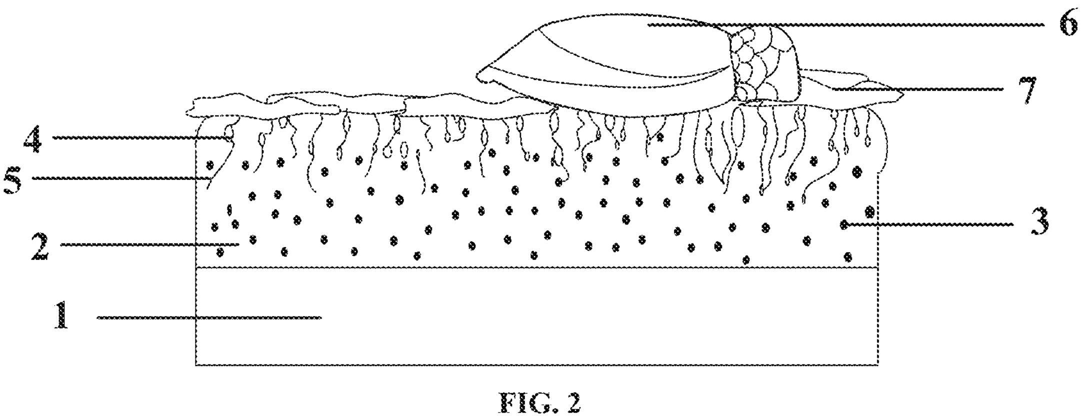
FIG. 2 shows a schematic diagram of an antifouling mechanism of an antifouling cladding layer with microchannels in a marine environment.
Figure 3:
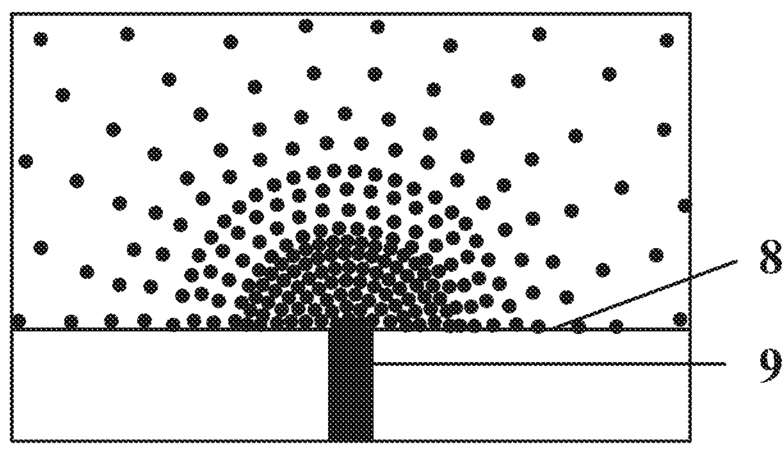
FIG. 3 shows a schematic diagram of concentration distribution of the copper ions in seawater near the microchannel.

FIG. 2 shows a schematic diagram of an antifouling mechanism of an antifouling cladding layer with microchannels in a marine environment. It can be seen from FIG. 2 that there are Cu-rich substrate phases and dispersedly-distributed Fe-rich precipitation phases in the antifouling cladding layer. During seawater immersion, a de-ironized layer with a thickness of 350 m and a large number of microchannels along the thickness direction could be formed in the antifouling cladding layer. Due to the microchannels and alloying of elements such as Fe, Sn, Si, and P, various corrosion products such as basic copper chloride, basic copper carbonate, tin oxide, and cuprous oxide are formed on the surface of the antifouling cladding layer, which are loose, layered with numerous cracks and holes. These corrosion products have highly low bonding strength, and are easy to peel off by themselves due to shear stress at a low water flow rate, achieving a self-polishing effect, thereby avoiding a significant reduction in the seepage rate of copper ions due to the thickening of dense corrosion products. The marine organisms attached to the surface of the antifouling cladding layer are more likely to be killed by the higher concentration of copper ions stored in the microchannel, thereby reducing the adhesion of marine organisms on the surface of the antifouling cladding layer and achieving long-term antifouling.

In some embodiments, when the metal substrate is any one of the steel substrate and the aluminum alloy substrate, a corrosion-resistant primer cladding layer is further provided between the metal substrate and the antifouling cladding layer. In some embodiments, the corrosion-resistant primer cladding layer has a thickness of 100 μm to 400 μm.

In some embodiments, the corrosion-resistant primer cladding layer is prepared by a raw material of a Ni—Cr—Mo—Nb—Si alloy powder, with a particle size of 200 mesh to 400 mesh.

In the present disclosure, the Ni—Cr—Mo—Nb—Si alloy powder is prepared by the following raw materials in mass percentage: Cr: 20% to 24%; Mo: 14% to 18%; Nb: 1% to 1.5%; Si: 0.5% to 1%; and Ni as a balance.

In the present disclosure, the Ni—Cr—Mo—Nb—Si alloy powder includes Cr with a mass percentage of 20% to 24%, preferably 21% to 23%, more preferably 22%.

In the present disclosure, the Ni—Cr—Mo—Nb—Si alloy powder includes Mo with a mass percentage of 14% to 18%, preferably 15% to 17%, more preferably 16%.

In the present disclosure, the Ni—Cr—Mo—Nb—Si alloy powder includes Nb with a mass percentage of 1% to 1.5%, preferably 1.1% to 1.4%, more preferably 1.2% to 1.3%.

In the present disclosure, the Ni—Cr—Mo—Nb—Si alloy powder includes Si with a mass percentage of 0.5% to 1%, preferably 0.6% to 0.9%, more preferably 0.7% to 0.8%.

In the present disclosure, the Ni—Cr—Mo—Nb—Si alloy powder includes Ni as a balance.

In some embodiments, a method for preparing the Ni—Cr—Mo—Nb—Si alloy powder includes the following steps:

mixing Ni, Cr, Mo, Nb, and Si according to the mass percentage, and conducting a second hot melting to obtain a primer alloy melt; and conducting a second atomization pulverization on the primer alloy melt to obtain the Ni—Cr—Mo—Nb—Si alloy powder.

In the present disclosure, Ni, Cr, Mo, Nb, and Si are mixed according to the mass percentage, and the second hot melting is conducted to obtain a primer alloy melt. The second hot melting is conducted at preferably 1,400° C. to 1,600° C., more preferably 1,450° C. to 1,550° C., and even more preferably 1,500° C. for preferably 30 min to 60 min, more preferably 40 min to 50 min.

In the present disclosure, the second atomization pulverization is conducted on the primer alloy melt to obtain the Ni—Cr—Mo—Nb—Si alloy powder. In some embodiments, the second atomization pulverization is conducted with nitrogen as an atomization medium under a flow rate of the primer alloy melt at preferably 0.5 kg/min to 1 kg/min, more preferably 0.6 kg/min to 0.9 kg/min, and even more preferably 0.7 kg/min to 0.8 kg/min. In some embodiments, after the second atomization pulverization, sieving is further conducted; there is no special limitation on parameters of the sieving, as long as the Ni—Cr—Mo—Nb—Si alloy powder with the target particle size could be obtained.

The present disclosure further provides a method for preparing the coating for preventing marine biofouling, including the following steps:

conducting a pretreatment on the metal substrate to obtain a pretreated substrate, wherein the metal substrate is selected from the group consisting of the steel substrate, the copper alloy substrate, the titanium alloy substrate, and the aluminum alloy substrate; and preparing the antifouling cladding layer by first laser cladding on the pretreated substrate to obtain the coating for preventing marine biofouling.

In the present disclosure, the pretreatment is conducted on the metal substrate to obtain the pretreated substrate. The metal substrate is selected from the group consisting of a steel substrate, a copper alloy substrate, a titanium alloy substrate, and an aluminum alloy substrate.

In some embodiments, the pretreatment includes removing oxide layer, washing, and drying in sequence. In some embodiments, a method for removing oxide layer removal includes any one of sandblasting and electric grinding wheel-based grinding; there is no special limitation on an operation of the sandblasting or the electric grinding wheel-based grinding, as long as the oxide layer on the surface of the metal substrate could be removed. In some embodiments, a reagent for the washing includes acetone. There is no specific limitation on a drying method, as long as the substrate could be dried.

In the present disclosure, the antifouling cladding layer is prepared by first laser cladding on the pretreated substrate to obtain the coating for preventing marine biofouling.

In the present disclosure, the first laser cladding is conducted at a powder feeding rate of preferably 0.8 kg/h to 2 kg/h, more preferably 1.0 kg/h to 1.5 kg/h, a laser power of preferably 2 kW to 6 kW, more preferably 3 kW to 5 kW, and even more preferably 4 kW, a relative movement speed of a laser spot and a workpiece of preferably 10 cm/s to 25 cm/s, more preferably 15 cm/s to 20 cm/s, a flow rate of a protective gas of preferably 15 L/min to 20 L/min, more preferably 16 L/min to 19 L/min, and even more preferably 17 L/min to 18 L/min, and a step distance of a laser head of preferably 0.5 mm to 0.8 mm, more preferably 0.6 mm to 0.7 mm. In some embodiments, the protective gas includes any one of argon and nitrogen.

In some embodiments, after the antifouling cladding layer is prepared, polishing is further conducted; there is no specific limitation on a polishing operation, as long as the surface of the antifouling cladding layer could be polished bright.

In some embodiments, when the metal substrate is any one of the steel substrate and the aluminum alloy substrate, a corrosion-resistant primer cladding layer is further prepared. In some embodiments, a method for preparing the corrosion-resistant primer cladding layer is a second laser cladding, which is conducted at a powder feeding rate of preferably 0.8 kg/h to 2 kg/h, more preferably 1.0 kg/h to 1.5 kg/h, a laser power of preferably 2 kW to 6 kW, more preferably 3 kW to 5 kW, and even more preferably 4 kW, a relative movement speed of a laser spot and a workpiece of preferably 10 cm/s to 25 cm/s, more preferably 15 cm/s to 20 cm/s, a flow rate of a protective gas of preferably 15 L/min to 20 L/min, more preferably 16 L/min to 19 L/min, and even more preferably 17 L/min to 18 L/min, and a step distance of a laser head of preferably 0.5 mm to 0.8 mm, more preferably 0.6 mm to 0.7 mm. In some embodiments, the protective gas includes any one of argon and nitrogen.

In some embodiments, after the corrosion-resistant primer cladding layer is prepared, polishing is further conducted; the polishing is conducted by electric cloth grinding wheel; there is no specific limitation on a polishing operation, as long as the surface of the corrosion-resistant primer cladding layer could be polished bright.

The coating for preventing marine biofouling and the preparation method thereof provided by the present disclosure will be described in detail with reference to the following examples.

However, the examples should not be understood as limiting the protection scope of the present disclosure.

Figure 4:
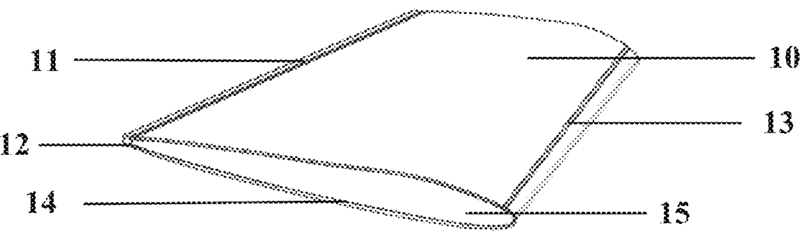
FIG. 4 shows a schematic diagram of cladding of a rudder blade according to Example 1.

Example 1: Preparation of a Coating for Preventing Marine Biofouling on a Surface of a Rudder Blade An assembled rudder blade made of Q345 was selected as a substrate to be clad. An edge of a curved surface to be clad was a trapezoid with an upper bottom of 850 mm, a lower bottom of 1250 mm, and a height of 1430 mm. A schematic diagram of the rudder blade cladding is shown in FIG. 4.

I. Powder Composition and Preparation

1. Composition of Alloy Powders (1) Raw Materials of a Ni—Cr—Mo—Nb—Si Alloy Powder:

Cr: 22 wt. %; Mo: 15 wt. %; Nb: 1 wt. %; Si: 0.5 wt. %; Ni as a balance; the above-mentioned raw materials each have a purity of greater than or equal to 99.9%.

(2) Raw Materials of a Cu—Fe—Sn—Si—P Alloy Powder:

Fe: 30 wt. %; Sn: 2 wt. %; Si: 0.5 wt. %; P: 0.2 wt. %; Cu as a balance; the above-mentioned raw materials each have a purity of greater than or equal to 99.9%.

Figure 14:
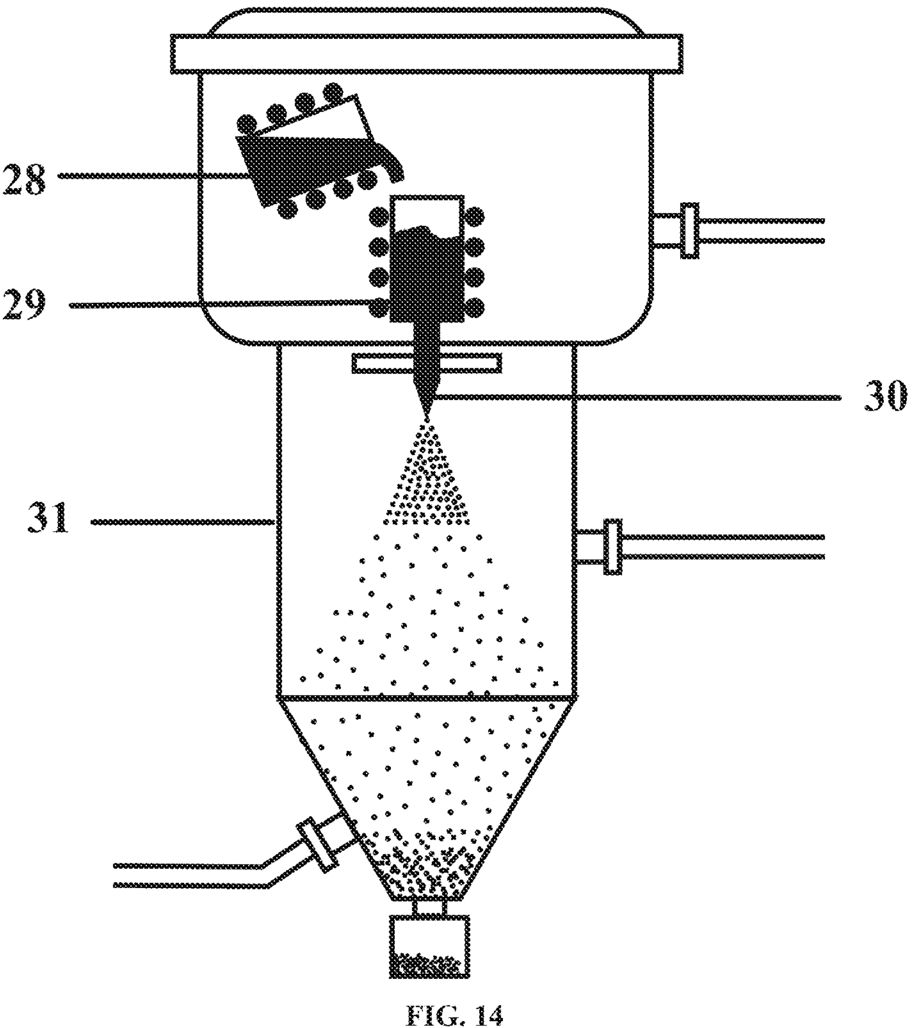
FIG. 14 shows a schematic diagram of an atomization and rapid condensation device.

2. Method for Preparing the Alloy Powders (1) Preparation of the Ni—Cr—Mo—Nb—Si Alloy Powder Ni, Cr, Mo, Nb, and Si according to the mass percentage of 1 (1) were placed in a vacuum medium-frequency induction furnace to conduct hot melting at 1,450° C. for 50 min to obtain a primer alloy melt;

- the primer alloy melt was poured into a crucible (i.e., a tundish) in an atomization and rapid condensation device, and then introduced into an atomization chamber from a nozzle of the crucible at a flow rate of 0.5 kg/min to conduct atomization pulverization under nitrogen as an atomization medium to obtain the alloy powder; a schematic diagram of the atomization and rapid condensation device is shown in FIG. 14; and
- the alloy powder was sieved to obtain a Ni—Cr—Mo—Nb—Si alloy powder, with a particle size of 200 mesh to 400 mesh.

(2) Preparation of the Cu—Fe—Sn—Si—P Alloy Powder

Fe, Sn, Si, Cu, and P were weighed according to the mass percentage of 1 (2), and metal Cu was placed in a vacuum medium-frequency induction furnace to conduct hot melting at 1,400° C.; after Cu was completely melted, Fe, Sn, Si, and P were added, and a molten alloy solution was kept at 1,400° C. for 50 min to obtain an antifouling alloy melt;

- the antifouling alloy melt was poured into a crucible in an atomization and rapid condensation device, and then introduced into an atomization chamber from a nozzle of the crucible at a flow rate of 0.7 kg/min to conduct atomization pulverization under nitrogen as an atomization medium to obtain the alloy powder; and
- the alloy powder was sieved to obtain a Cu—Fe—Sn—Si—P alloy powder, with a particle size of 200 mesh to 400 mesh.

II. Preparation Process of a Cladding Layer

Laser cladding is a relatively mature process. In this example, a rudder blade was prepared using a high-speed laser cladding system with coaxial powder feeding. The cladding system mainly consisted of: a 3.3 kW fiber laser, a water cooling system, a coaxial powder feeding system, a gas protection system, a cladding workbench for complex curved surfaces with movement of a laser head controlled by a mechanical arm, and a control system. A process for preparing the cladding layer was performed as follows:

1. Preparation of a Corrosion-Resistant Primer Cladding Layer (1) A surface of a Q345 steel plate of the rudder blade was subjected to rust removal by an electric grinding wheel, and washed with acetone to remove oil stains, and a surface-treated rudder blade to be clad was fixed on a cladding workbench; and (2) the Ni—Cr—Mo—Nb—Si alloy powder with a particle size of 200 mesh to 400 mesh was added into a powder storage container of a pneumatic powder feeder, and the corrosion-resistant primer cladding layer was prepared by a method of laser head movement and laser overlapping cladding. The laser overlapping cladding was conducted at a powder feeding rate of 0.8 kg/h, a laser power of 2.5 kW, a relative movement speed of a laser spot and a workpiece of 18 cm/s, a flow rate of a protective gas argon of 15 L/min, and a step distance of a laser head of 0.7 mm. Thereby, the corrosion-resistant primer cladding layer was obtained with an average thickness of 300 μm.

Figure 5:
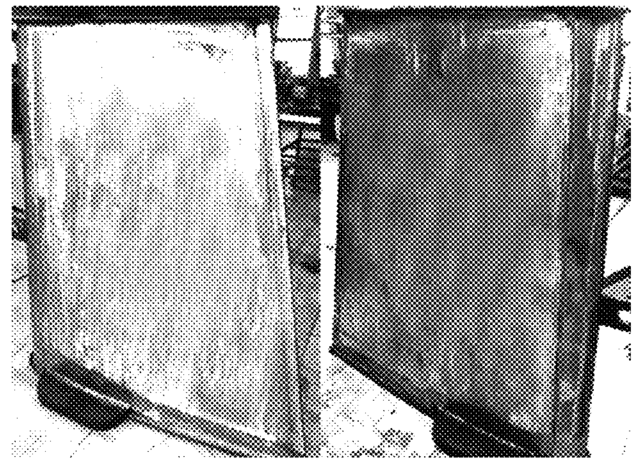
FIG. 5 shows a real picture after cladding of the rudder blade according to Example 1 is completed.

2. Preparation of an Antifouling Cladding Layer (1) The surface of the corrosion-resistant primer cladding layer prepared in step 1 was polished to bright by an electric cloth grinding wheel;

(2) the Cu—Fe—Sn—Si—P alloy powder was added into a powder storage container of a pneumatic powder feeder, and the antifouling cladding layer was prepared by a method of laser head movement and laser overlapping cladding on a surface of the corrosion-resistant primer cladding layer obtained in step 1; the laser overlapping cladding was conducted at a powder feeding rate of 1 kg/h, a laser power of 2.6 kW, a relative movement speed of a laser spot and a workpiece of 15 cm/s, a flow rate of a protective gas argon of 15 L/min, and a step distance of a laser head of 0.6 mm; thereby, the antifouling cladding layer was obtained with an average thickness of 700 m; and (3) after the cladding was completed, the surface of the rudder blade was polished to bright using an electric cloth grinding wheel, and the surface of the cladding layer was smoothed using an angle grinder. After grinding, a physical picture of the rudder blade after cladding was shown in FIG. 5; it can be seen from FIG. 5 that the cladding layer on the surface of the sample has a desirable appearance without defects such as cracks and holes.

Example 2: Preparation of a Coating for Preventing Marine Biofouling on an A32 Steel Plate of a Hull Below a Waterline An A32 steel plate was selected as a substrate to be clad, with a size of: 16,000 mm×2,000 mm×12 mm.

I. Powder Composition and Preparation

1. Composition of Alloy Powders (1) Raw Materials of a Ni—Cr—Mo—Nb—Si Alloy Powder:

Cr: 24 wt. %; Mo: 17 wt. %; Nb: 1.2 wt. %; Si: 0.6 wt. %; Ni as a balance; the above-mentioned raw materials each have a purity of greater than or equal to 99.9%.

(2) Raw Materials of a Cu—Fe—Sn—Si—P Alloy Powder:

Fe: 12 wt. %; Sn: 0.5 wt. %; Si: 0.3 wt. %; P: 0.1 wt. %; Cu as a balance; the above-mentioned raw materials each have a purity of greater than or equal to 99.9%.

2. Method for Preparing the Alloy Powders (1) Preparation of the Ni—Cr—Mo—Nb—Si Alloy Powder Ni, Cr, Mo, Nb, and Si according to the mass percentage of (1) were placed in a vacuum medium-frequency induction furnace to conduct hot melting at 1,500° C. for 50 min to obtain a primer alloy melt;

the primer alloy melt was poured into a crucible in an atomization and rapid condensation device, and then introduced into an atomization chamber from a nozzle of the crucible at a flow rate of 0.6 kg/min to conduct atomization pulverization under nitrogen as an atomization medium to obtain the alloy powder; and the alloy powder was sieved to obtain a Ni—Cr—Mo—Nb—Si alloy powder, with a particle size of 200 mesh to 400 mesh.

(2) Preparation of the Cu—Fe—Sn—Si—P Alloy Powder

Fe, Sn, Si, Cu, and P were weighed according to the mass percentage of 1 (2), metal Cu was placed in a vacuum medium-frequency induction furnace to conduct hot melting at 1,380° C.; after Cu was completely melted, Fe, Sn, Si, and P were added, and a molten alloy solution was kept at 1,380° C. d for 50 min to obtain an antifouling alloy melt;

the antifouling alloy melt was poured into a crucible in an atomization and rapid condensation device, and then introduced into an atomization chamber from a nozzle of the crucible at a flow rate of 0.6 kg/min to conduct atomization pulverization under nitrogen as an atomization medium to obtain the alloy powder; and the alloy powder was sieved to obtain a Cu—Fe—Sn—Si—P alloy powder, with a particle size of 200 mesh to 400 mesh.

II. Preparation Process of a Cladding Layer

A32 steel plate samples were prepared by a high-speed laser cladding system with coaxial powder feeding. The cladding system mainly consisted of: a 4 kW fiber laser, a water cooling system, a coaxial powder feeding system, a gas protection system, a plate cladding workbench, and a control system. The laser acted as a laser source, which was radiated to a surface of the substrate material after being converged by the lens. The water cooling system provided cooling water at an appropriate temperature for a laser box to prevent the box from overheating. The plate workbench could fix the steel plate. The gas protection system prevented oxidation during cladding. The high-speed laser cladding system with coaxial powder feeding had advantages of a high powder utilization rate and a low dilution rate. A process for preparing the cladding layer was performed as follows:

1. Preparation of a Corrosion-Resistant Primer Cladding Layer (1) By an electric grinding wheel, the surface of the fixed steel plate was polished until it was smooth without tiny holes, oxides and other impurities were removed on the surface of the sample, and the surface of the sample was washed with an acetone solution to remove oil stains.

(2) The Ni—Cr—Mo—Nb—Si alloy powder with a particle size of 200 mesh to 400 mesh was added into a powder storage container of a pneumatic powder feeder, and the corrosion-resistant primer cladding layer was prepared by a method of laser head stepping movement and laser overlapping cladding. The laser overlapping cladding was conducted at a powder feeding rate of 1.2 kg/h, a laser power of 2.6 kW, a relative movement speed of a laser spot and a workpiece of 25 cm/s, a flow rate of a protective gas argon of 15 L/min, and a step distance of a laser head of 0.5 mm. Thereby, the corrosion-resistant primer cladding layer was obtained with an average thickness of 300 m.

2. Preparation of an Antifouling Cladding Layer (1) The surface of the corrosion-resistant primer cladding layer prepared in step 1 was polished by an angle grinder; and (2) the Cu—Fe—Sn—Si—P alloy powder was added into a powder storage container of a pneumatic powder feeder, and the antifouling cladding layer was prepared by a method of laser head stepping movement and laser overlapping cladding on a surface of the corrosion-resistant primer cladding layer obtained in step 1; the laser overlapping cladding was conducted at a powder feeding rate of 1.2 kg/h, a laser power of 3 kW, a relative movement speed of a laser spot and a workpiece of 20 cm/s, a flow rate of a protective gas argon of 15 L/min, and a step distance of a laser head of 0.7 mm; thereby, the antifouling cladding layer was obtained with an average thickness of 500 m.

A copper ion seepage rate of the antifouling cladding layer was calculated according to the national standard "GB/T 6824-2008". The copper ion seepage rate was calculated from the copper ion concentration by a formula as follows:

$$R = \frac{[(\rho_V \times F) - \rho_B] \times V \times 24}{t \times A}$$

In which,

R—copper ion seepage rate ($\mu g \cdot cm^{-2} \cdot d^{-1}$);

$\rho_V$—mass concentration of copper ions in the leachate ($\mu g \cdot L^{-1}$);

F—correction factor for leachate samples, F=1.01

$\rho_B$—mass concentration of copper ions in an artificial seawater blank solution ($\mu g \cdot L^{-1}$);

V—the volume of simulated seawater solution in the seepage tank (1.4 L);

t—the immersion time of the cladding layer sample in the seepage tank (1 h); and A—the exposed surface area of the sample ($cm^2$).

Existing studies show that for a smooth and flat surface, when the ion release rate reaches 40 $\mu g \cdot cm^{-2} \cdot d^{-1}$, most of the marine organisms could be prevented, such as barnacles, algae, hydra, and jellyfish.

Figure 6:
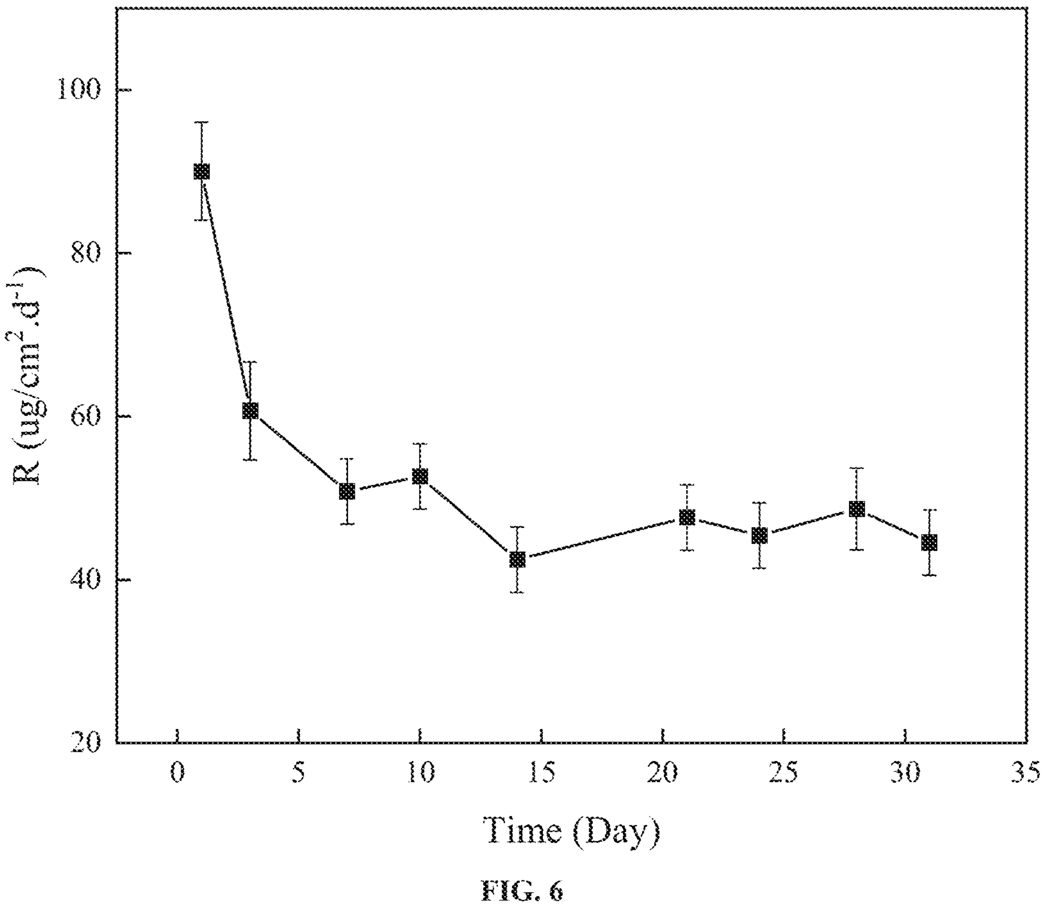
FIG. 6 shows a curve of a copper ion release rate that the coating for preventing marine biofouling prepared according to Example 2 is immersed in a simulated seawater environment for one month.

FIG. 6 shows a curve of the copper ion release rate that the coating for preventing marine biofouling prepared according to Example 2 was immersed in a simulated seawater environment for one month. It can be seen from FIG. 6 that the release rate of copper ions is relatively high at the initial stage of immersion, and then decreases with time and gradually stabilizes. All release rates are greater than 40 $\mu g \cdot cm^{-2} \cdot d^{-1}$.

Example 3: Preparation of a Coating for Preventing Marine Biofouling on a Hubcap of a Propeller The propeller hubcap was made of a corrosion-resistant copper alloy, such that the antifouling cladding layer was only prepared on the surface. The propeller hubcap was selected as a substrate material to be clad, where the hubcap was conical in shape with a bottom radius of 8 cm and a height of 18 cm.

I. Powder Composition and Preparation

1. Composition of Alloy Powders

Raw Materials of a Cu—Fe—Sn—Si—P Alloy Powder:

Fe: 20 wt. %; Sn: 4 wt. %; Si: 0.5 wt. %; P: 0.5 wt. %; Cu as a balance; the above-mentioned raw materials each have a purity of greater than or equal to 99.9%.

2. Method for Preparing the Alloy Powders

Fe, Sn, Si, Cu, and P were weighed according to the mass percentage of 1, metal Cu was placed in a vacuum medium-frequency induction furnace to conduct hot melting at 1,440° C.; after Cu was completely melted, Fe, Sn, Si, and P were added, and a molten alloy solution was kept at 1,440° C. d for 50 min to obtain an antifouling alloy melt;

the antifouling alloy melt was poured into a crucible in an atomization and rapid condensation device, and then introduced into an atomization chamber from a nozzle of the crucible at a flow rate of 0.8 kg/min to conduct atomization pulverization under nitrogen as an atomization medium to obtain the alloy powder; and the alloy powder was sieved to obtain a Cu—Fe—Sn—Si—P alloy powder, with a particle size of 200 mesh to 400 mesh.

II. Preparation Process of a Cladding Layer

A propeller hubcap sample was prepared by a speed laser cladding system with coaxial powder feeding. The cladding system mainly consisted of: a 3 kW high-speed fiber laser, a water cooling system, a coaxial powder feeding system, a gas protection system, a cladding workbench for complex shaped parts, and a control system.

The process for preparing the antifouling cladding layer was performed as follows:

1. The hubcap was fixed on a rotatable and displaceable laser cladding workbench with a three-way chuck, and rotated at a slow speed, oxides on the surface of the hubcap were removed by an electric grinding wheel, and the surface of the sample was washed by an acetone solution to remove oil stains.

2. The Cu—Fe—Sn—Si—P alloy powder was added into a powder storage container of a pneumatic powder feeder, and the antifouling cladding layer was prepared by a method of rotating motion of the propeller hubcap, laser head stepping movement, and overlapping cladding on the surface of the propeller hubcap; the laser overlapping cladding was conducted at a powder feeding rate of 1 kg/h, a laser power of 2.6 kW, a relative movement speed of a laser spot and a workpiece of 15 cm/s, a flow rate of a protective gas argon of 15 L/min, and a step distance of a laser head of 0.6 mm; thereby, the antifouling cladding layer was obtained with an average thickness of 600 m.

III. Description of Other Follow-Up Processes

Figure 7:
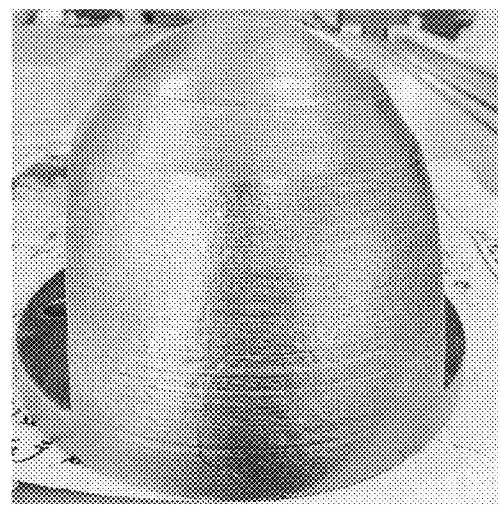
FIG. 7 shows a real picture after cladding of a propeller hubcap according to Example 3 is completed.

After the cladding was completed, the surface of the propeller hubcap was polished by an electric cloth grinding wheel. After polishing, a physical picture of the propeller hubcap after cladding is shown in FIG. 7. It can be seen from FIG. 7 that the cladding layer on the surface of the sample has a desirable appearance without defects such as cracks and holes.

Figure 8:
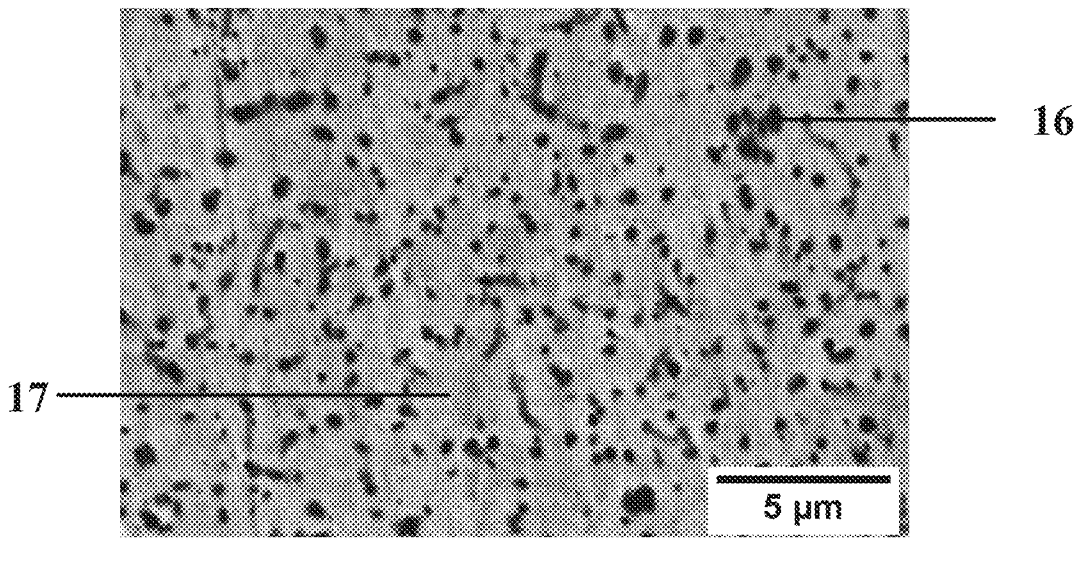
FIG. 8 shows a scanning electron microscopy (SEM) image of a cross-section of the antifouling cladding layer prepared according to Example 2.

FIG. 8 shows a SEM image of a cross-section of the antifouling cladding layer prepared according to Example 2. It can be seen from FIG. 8 that the antifouling cladding layer includes a Fe-rich precipitation phase 16 and a Cu-rich substrate phase 17.

Figure 9:
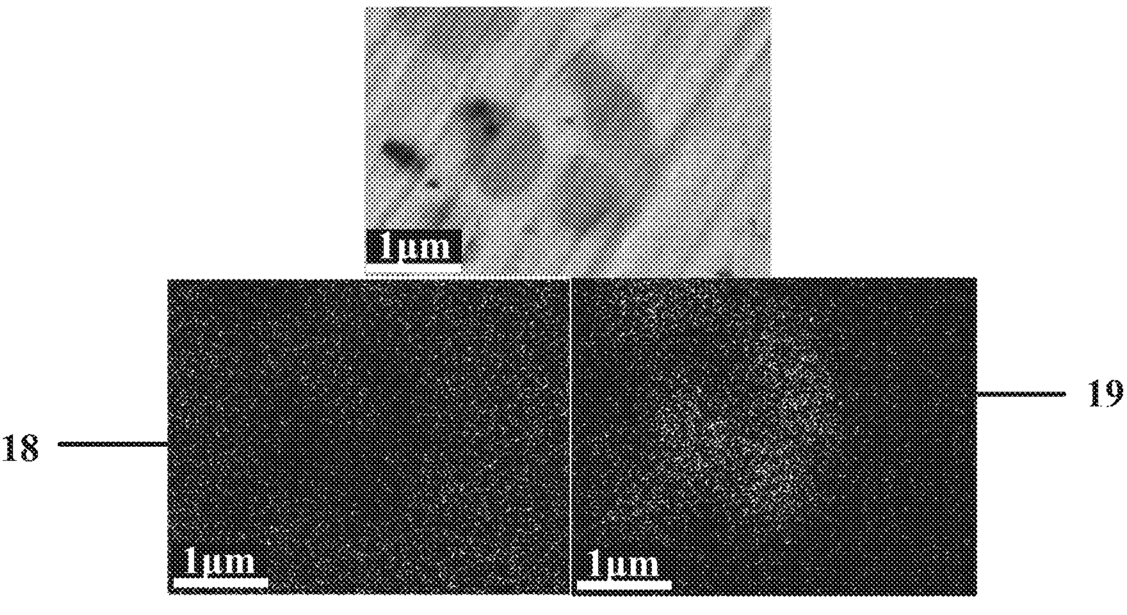
FIG. 9 shows a result of a surface scanning analysis of 16 in FIG. 8.

FIG. 9 shows the results of surface scan analysis on 16 in FIG. 8 (only Cu and Fe contents were analyzed). It can be seen from FIG. 9 that Fe elements are concentrated in the 19, while Cu elements are mainly distributed in the 18.

Table 1 shows an energy spectrum analysis result of 16 in FIG. 8.

TABLE 1

Energy spectrum analysis result of 16 in FIG. 8 (only analysis of Cu and Fe contents)

| | Element | |
|---|---|---|
| | Cu | Fe |
| Mass fraction of each element (wt. %) | 32.0 | 68.0 |

It can be seen from Table 1 that the mass fraction of Fe is 68.0%, and the mass fraction of Cu is 32.0%.

Table 2 shows an energy spectrum analysis result of 17 in FIG. 8.

TABLE 2

Energy spectrum analysis result of 17 in FIG. 8 (only analysis of Cu and Fe contents)

| | Element | |
|---|---|---|
| | Cu | Fe |
| Mass fraction of each element (wt. %) | 93.8 | 6.2 |

It can be seen from Table 2 that the mass fraction of Fe is 6.2%, and the mass fraction of Cu is 93.8%.

Figure 10:
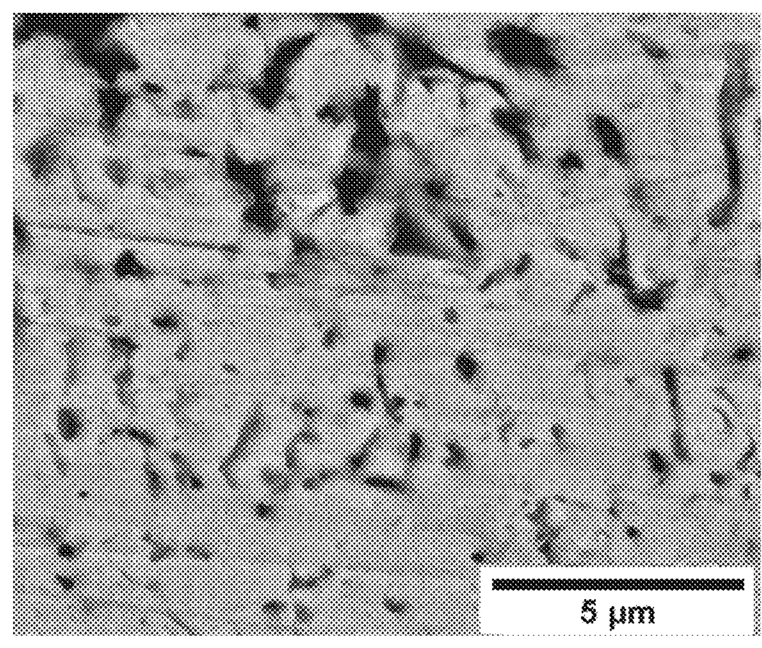
FIG. 10 shows a SEM image of microchannels formed in the antifouling cladding layer according to Example 2 after immersing in the simulated seawater environment for 2 months.

FIG. 10 shows a SEM image of microchannels formed in the antifouling cladding layer according to Example 2 after immersing in a simulated seawater environment for 2 months. It can be seen from FIG. 10 that the top of the antifouling cladding layer has a larger pore size, and then the pore size gradually decreases with an increase of the depth of the antifouling cladding layer, and the microchannel has a diameter of 200 nm to 3,000 nm.

Figure 11:
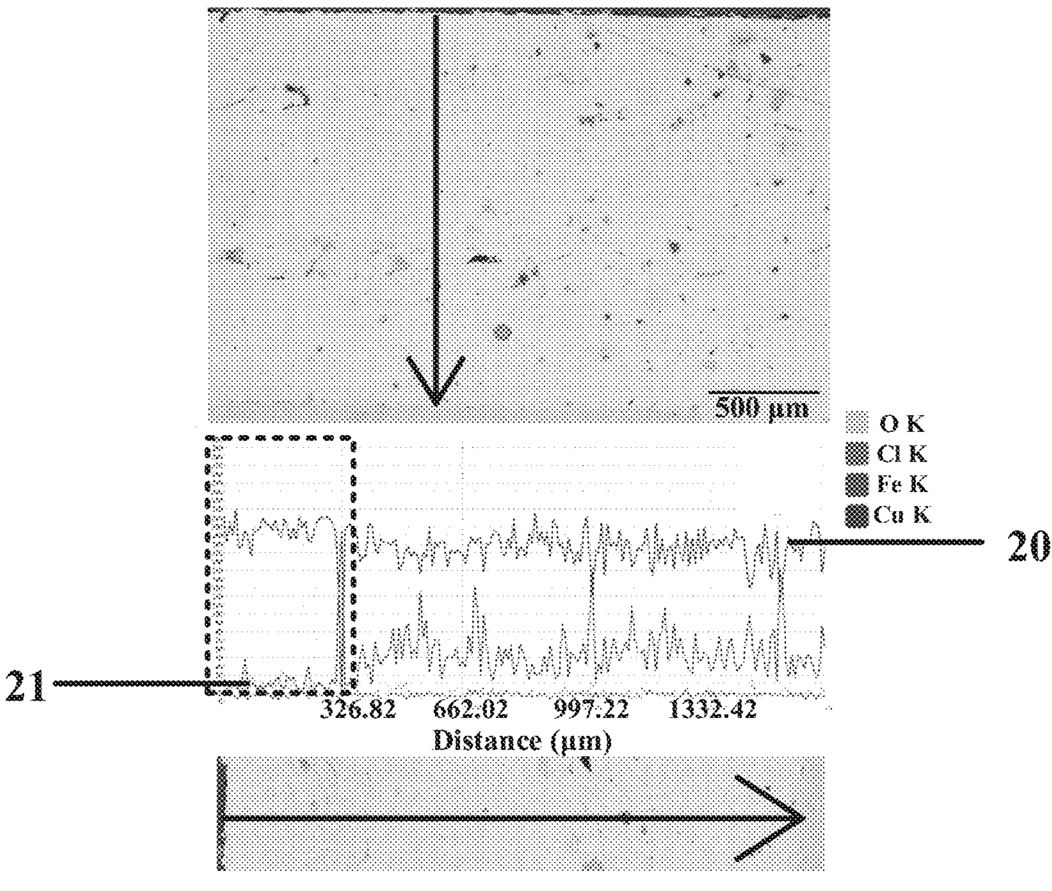
FIG. 11 shows a line scanning result of the cross-section of the antifouling cladding layer according to Example 2 after immersing in the simulated seawater environment for 2 months.

FIG. 11 shows a line scanning result of the cross-section of the antifouling cladding layer according to Example 2 after immersing in the simulated seawater environment for 2 months. It can be seen from FIG. 11 that after immersion for 2 months, the content of Fe element at about 350 m in a thickness direction of the antifouling cladding layer decreases significantly, while the content of Cu element increases, indicating that a de-ironized layer with a depth of about 350 m is formed along the thickness direction in the antifouling cladding layer.

Figure 12:
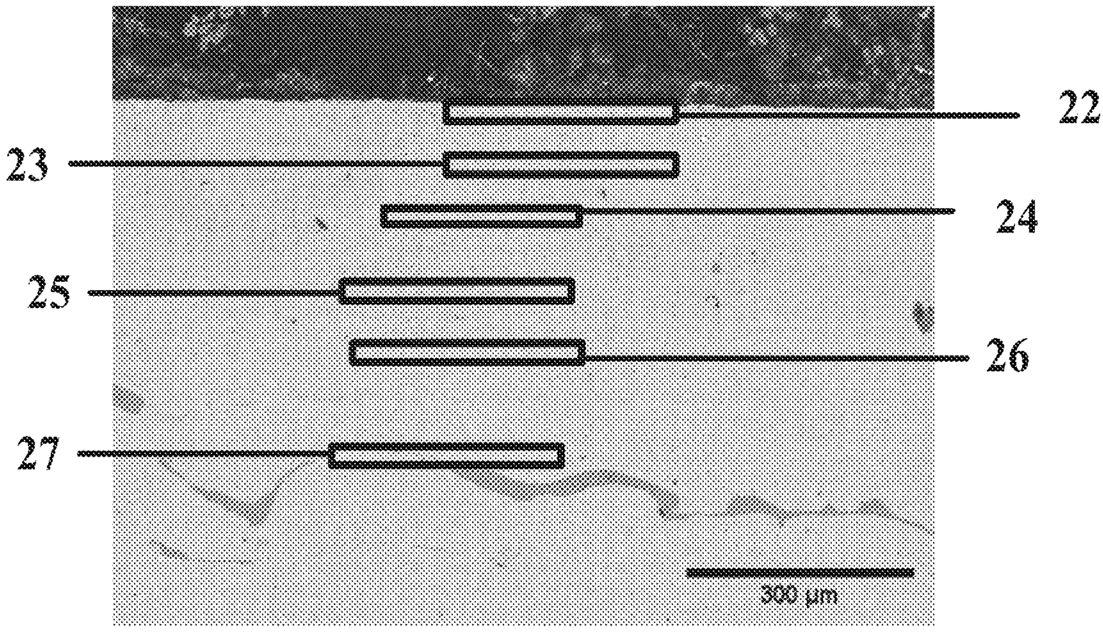
FIG. 12 shows a SEM image at low magnification of the cross-section of the antifouling cladding layer with micro-channels according to Example 2 after immersing in the simulated seawater environment for 2 months.

FIG. 12 shows a SEM image at low magnification of the cross-section of the antifouling cladding layer with microchannels according to Example 2 after immersing in the simulated seawater environment for 2 months.

Table 3 shows the results of microcell energy spectrum analysis of areas 22 to 27 in FIG. 12.

TABLE 3

Energy spectrum analysis result of areas 22 to 27 in FIG. 12 (only analysis of Cu, Fe, O, and Cl contents)

| Area | Distance from surface (μm) | Cu (wt. %) | Fe (wt. %) | O (wt. %) | Cl (wt. %) |
|---|---|---|---|---|---|
| 22 | 0 | 76.9 | 9.4 | 10.1 | 3.6 |
| 23 | 60.35 | 94.0 | 4.8 | 0.6 | 0.6 |
| 24 | 115.60 | 92.2 | 4.9 | 2.1 | 0.9 |
| 25 | 190.34 | 94.7 | 4.3 | 0.5 | 0.5 |
| 26 | 256.78 | 90.7 | 7.1 | 0.9 | 1.4 |
| 27 | 354.31 | 84.5 | 11.6 | 3.3 | 0.6 |

It can be seen from Table 3 that the Fe content in the de-ironized layer-containing microchannels is significantly reduced, reaching a minimum of 4.3%. According to the analysis, the residual iron contained in the de-ironized layer is composed of iron corrosion products and a small amount of iron not participated in the reaction. The increase of Fe content at the top of the de-ironized layer is caused by the formation of Fe corrosion products on the surface of the antifouling cladding layer.

Figure 13:
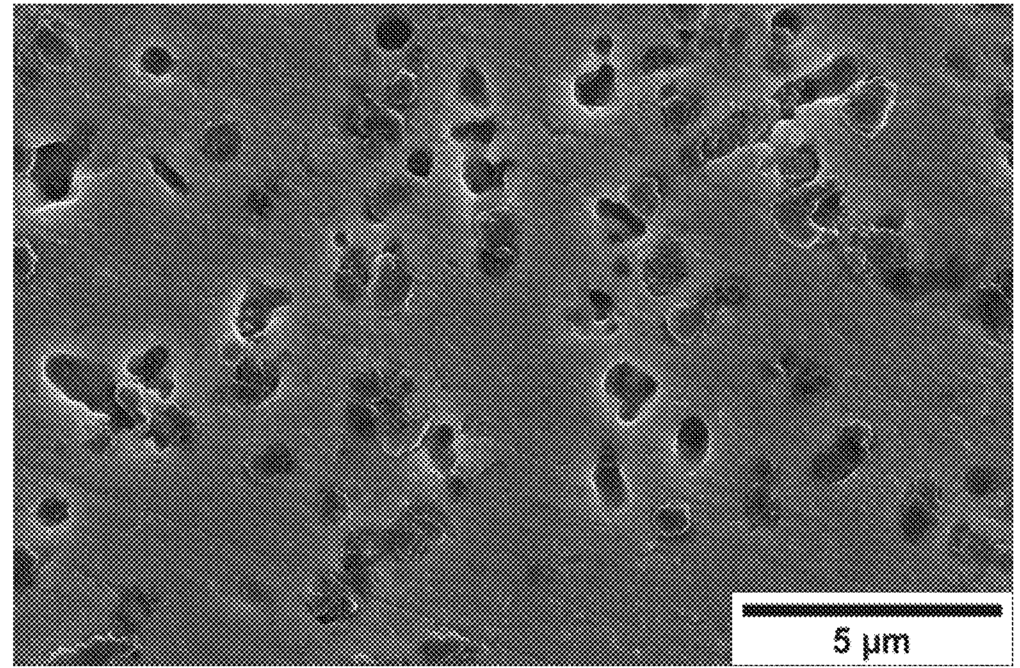
FIG. 13 shows a surface appearance diagram of the antifouling cladding layer according to Example 2 after immersing in the simulated seawater environment for 2 months.

FIG. 13 shows a surface appearance diagram of the antifouling cladding layer according to Example 2 after immersing in the simulated seawater environment for 2 months. It can be seen from FIG. 13 that there are a large number of micro-holes on the surface of the antifouling cladding layer (that is, an outlet of the microchannel).

The above descriptions are merely preferred embodiments of the present disclosure. It should be noted that improvements and modifications may be made by a person of ordinary skill in the art without departing from the principle of the present disclosure, which should be deemed as falling within the protection scope of the present disclosure.

What is claimed is:

1. A coating for preventing marine biofouling, consisting of an antifouling cladding layer disposed on a metal substrate, wherein:

the antifouling cladding layer is a metastable-phase antifouling cladding layer;

the antifouling cladding layer comprises a dispersedly distributed Fe-rich precipitation phase and a Cu-rich solid solution containing supersaturated Fe, and the Cu-rich solid solution containing supersaturated Fe is a Cu—Fe—Sn—Si—P copper-based solid solution;

the antifouling cladding layer is prepared by a raw material of a Cu—Fe—Sn—Si—P alloy powder;

the Cu—Fe—Sn—Si—P alloy powder consists of the following raw materials in mass percentage:

Fe: 8% to 40%; Sn: 0.3% to 8%; Si: 0.1% to 0.5%; P: 0.1% to 0.5%; and Cu as a balance; and the metal substrate is selected from the group consisting of a steel substrate, a copper alloy substrate, a titanium alloy substrate, and an aluminum alloy substrate.

2. The coating for preventing marine biofouling of claim 1, wherein the antifouling cladding layer has a thickness of 300 μm to 1,000 μm.

3. The coating for preventing marine biofouling of claim 1, wherein the Cu—Fe—Sn—Si—P alloy powder has a particle size of 200 mesh to 400 mesh.

4. The coating for preventing marine biofouling of claim 3, wherein the Cu—Fe—Sn—Si—P alloy powder is prepared by a method comprising the following steps:

mixing Cu, Fe, Sn, Si, and P according to the mass percentage, and conducting a first hot melting to obtain an antifouling alloy melt; and conducting a first atomization pulverization on the antifouling alloy melt to obtain the Cu—Fe—Sn—Si—P alloy powder, wherein the first hot melting is conducted at a temperature of 1,180° C. to 1,450° C. for 30 min to 60 min; and the first atomization pulverization is conducted with nitrogen as an atomization medium under a flow rate of the antifouling alloy melt at 0.5 kg/min to 1 kg/min.

5. The coating for preventing marine biofouling of claim 1, wherein the Cu—Fe—Sn—Si—P alloy powder is prepared by a method comprising the following steps:

mixing Cu, Fe, Sn, Si, and P according to the mass percentage, and conducting a first hot melting to obtain an antifouling alloy melt; and conducting a first atomization pulverization on the antifouling alloy melt to obtain the Cu—Fe—Sn—Si—P alloy powder, wherein the first hot melting is conducted at a temperature of 1,180° C. to 1,450° C. for 30 min to 60 min; and the first atomization pulverization is conducted with nitrogen as an atomization medium under a flow rate of the antifouling alloy melt at 0.5 kg/min to 1 kg/min.

6. A method for preparing the coating for preventing marine biofouling of claim 1, comprising the following steps:

conducting a pretreatment on the metal substrate to obtain a pretreated substrate, wherein the metal substrate is selected from the group consisting of the steel substrate, the copper alloy substrate, the titanium alloy substrate, and the aluminum alloy substrate; and preparing the antifouling cladding layer by first laser cladding on the pretreated substrate to obtain the coating for preventing marine biofouling.

7. The method of claim 6, wherein the first laser cladding is conducted at a powder feeding rate of 0.8 kg/h to 2 kg/h, a laser power of 2 kW to 6 kW, a relative movement speed of a laser spot and a workpiece of 10 cm/s to 25 cm/s, a flow rate of a protective gas of 15 L/min to 20 L/min, and a step distance of a laser head of 0.5 mm to 0.8 mm.

8. The method of claim 6, wherein the pretreatment comprises removing oxide layer, washing, and drying in sequence; the removing oxide layer is conducted by any one of sandblasting and electric grinding wheel-based grinding; and a reagent for the washing comprises acetone.

9. The method of claim 6, wherein the antifouling cladding layer has a thickness of 300 μm to 1,000 μm.

10. The method of claim 6, wherein the Cu—Fe—Sn—Si—P alloy powder has a particle size of 200 mesh to 400 mesh.

11. The method of claim 6, wherein the Cu—Fe—Sn—Si—P alloy powder is prepared by a method comprising the following steps:

mixing Cu, Fe, Sn, Si, and P according to the mass percentage, and conducting a first hot melting to obtain an antifouling alloy melt; and conducting a first atomization pulverization on the antifouling alloy melt to obtain the Cu—Fe—Sn—Si—P alloy powder, wherein the first hot melting is conducted at a temperature of 1,180° C. to 1,450° C. for 30 min to 60 min; and the first atomization pulverization is conducted with nitrogen as an atomization medium under a flow rate of the antifouling alloy melt at 0.5 kg/min to 1 kg/min.

12. A coating for preventing marine biofouling, consisting of an antifouling cladding layer, a corrosion-resistant primer cladding layer, and a metal substrate, with the corrosion-resistant primer cladding layer being between the metal substrate and the antifouling cladding layer, wherein:

the antifouling cladding layer is a metastable-phase antifouling cladding layer;

the antifouling cladding layer comprises a dispersedly distributed Fe-rich precipitation phase and a Cu-rich solid solution containing supersaturated Fe, and the Cu-rich solid solution containing supersaturated Fe is a Cu—Fe—Sn—Si—P copper-based solid solution;

the antifouling cladding layer is prepared by a raw material of a Cu—Fe—Sn—Si—P alloy powder;

the Cu—Fe—Sn—Si—P alloy powder consists of the following raw materials in mass percentage: Fe: 8% to 40%; Sn: 0.3% to 8%; Si: 0.1% to 0.5%; P: 0.1% to 0.5%; and Cu as a balance;

the metal substrate is one of a steel substrate and an aluminum alloy substrate;

the corrosion-resistant primer cladding layer is prepared by a raw material of a Ni—Cr—Mo—Nb—Si alloy powder; and the Ni—Cr—Mo—Nb—Si alloy powder consists of the following raw materials in mass percentage:

Cr: 20% to 24%; Mo: 14% to 18%; Nb: 1% to 1.5%; Si: 0.5% to 1%; and Ni as a balance.

13. The coating for preventing marine biofouling of claim 12, wherein the Ni—Cr—Mo—Nb—Si alloy powder is prepared by a method comprising the following steps:

mixing Ni, Cr, Mo, Nb, and Si according to the mass percentage, and conducting a second hot melting to obtain a primer alloy melt; and conducting a second atomization pulverization on the primer alloy melt to obtain the Ni—Cr—Mo—Nb—Si alloy powder, wherein the second hot melting is conducted at 1,400° C. to 1,600° C. for 30 min to 60 min; and the second atomization pulverization is conducted with nitrogen as an atomization medium under a flow rate of the primer alloy melt at 0.5 kg/min to 1 kg/min.

14. The coating for preventing marine biofouling of claim 12, wherein the corrosion-resistant primer cladding layer has a thickness of 100 μm to 400 μm.

15. The coating for preventing marine biofouling of claim 12, wherein the Ni—Cr—Mo—Nb—Si alloy powder has a particle size of 200 mesh to 400 mesh.

* * * * *